United States Patent

[11] 3,593,652

| [72] | Inventor | Auguste Lostanlen<br>46, Rue Auguste Buisson, 92 La Garenne,<br>Columbes, France |
|---|---|---|
| [21] | Appl. No. | 812,673 |
| [22] | Filed | Apr. 2, 1969 |
| [45] | Patented | July 20, 1971 |
| [32] | Priority | Apr. 3, 1968 |
| [33] | | France |
| [31] | | 146,868 |

[54] GRIDDLE
11 Claims, 6 Drawing Figs.

[52] U.S. Cl. .................................................. 99/423
[51] Int. Cl. ................................................... A47j 37/10
[50] Field of Search ........................................... 99/423,
422, 424, 425, 444, 353; 107/4, 4 (.45), 27, 28,
29, 52, 54, 54 (.21), 54 (.28), 57, 60; 118/24, 25,
323, 326

[56] References Cited
UNITED STATES PATENTS

| 524,263 | 8/1894 | Murray et al. ................ | 107/28 |
| 1,378,377 | 5/1921 | Heathcote ..................... | 107/29 |
| 1,595,822 | 8/1926 | Du Charme ................... | 107/28 |
| 2,854,945 | 10/1958 | Ackles .......................... | 118/24 X |
| 3,215,062 | 11/1965 | Frankenberg ................. | 99/424 X |

FOREIGN PATENTS

| 110,039 | 3/1944 | Sweden ....................... | 99/423 |

*Primary Examiner*—Walter A. Scheel
*Assistant Examiner*—Arthur O. Henderson
*Attorney*—Fishman and Van Kirk ABSTRACT: A griddle particularly suited for the making of pancakes, the apparatus being characterized by a horizontal cooking surface and a movable batter dispensing mechanism disposed above the cooking surface. The batter dispensing mechanism comprises a trolley which includes a normally closed funnel extending across the cooking surface, the mouth of the funnel being capable of being opened to dispense batter on the cooking surface as the trolley is passed thereover.

GRIDDLE

BACKGROUND OF THE INVENTION

1. Field of the Invention

The present invention relates to the preparation of edible matter by cooking on a surface. More specifically, the present invention is directed to the combination of a griddle and means for dispensing edible material on the cooking surface thereof. Accordingly, the general objects of the present invention are to provide novel and improved methods and apparatus of such character.

2. Description of the Prior Art

While not limited thereto in its utility, the present invention is particularly well suited for the making of pancakes. Pancake making machines of an automatic or semiautomatic nature have previously been proposed. An example of such a machine may be found in copending application Ser. No. 698,262 filed Jan. 6, 1968 now U.S. Pat. No. 3,489,106 by the same inventor as named herein. Prior art apparatus, such as that disclosed in application Ser. No. 698,262, while performing adequately, have been comparatively complex and thus expensive mechanisms. In addition, such automatic griddles are lacking in portability and, while producing a uniform and highly acceptable product, did not enable adjustment of pancake thickness to be readily made.

SUMMARY OF THE INVENTION

The present invention overcomes the above briefly discussed and other problems of the prior art and, in so doing, provides a novel and useful pancake making machine characterized by uncomplicated structure. Due to its simplicity, the present invention is easily transportable and, due to the novel design thereof, the present invention enables pancakes which are uniformly of good quality and which may be of varying thickness to be made rapidly and easily.

In accomplishing the foregoing, the present invention comprises a horizontal hot plate which is disposed in a drawer or basin fitted with two horizontal rails. The horizontal rails extend along either side of the hot plate and support a dispensing mechanism above the plate. The dispensing mechanism comprises a trolley including a batter-containing funnel, the funnel having an adjustable distribution slot facing the surface of the hot plate. The present invention is also characterized by adjustable means for controlling the opening and closing of the distribution slot so that batter may be deposited on the cooking surface of the hot plate when the trolley is moved thereacross, the batter being retained in the funnel at other times through the closing of the slot. The present invention is further characterized by means for collecting for reuse spillage which may occur during the dispensing of material from the funnel onto the cooking surface.

BRIEF DESCRIPTION OF THE DRAWING

The present invention may be better understood and its numerous objects and advantages will become apparent to those skilled in the art by reference to the accompanying drawing wherein like reference numerals refer to like elements in the various figures and in which.

DESCRIPTION OF THE PREFERRED EMBODIMENTS

Figure 1:
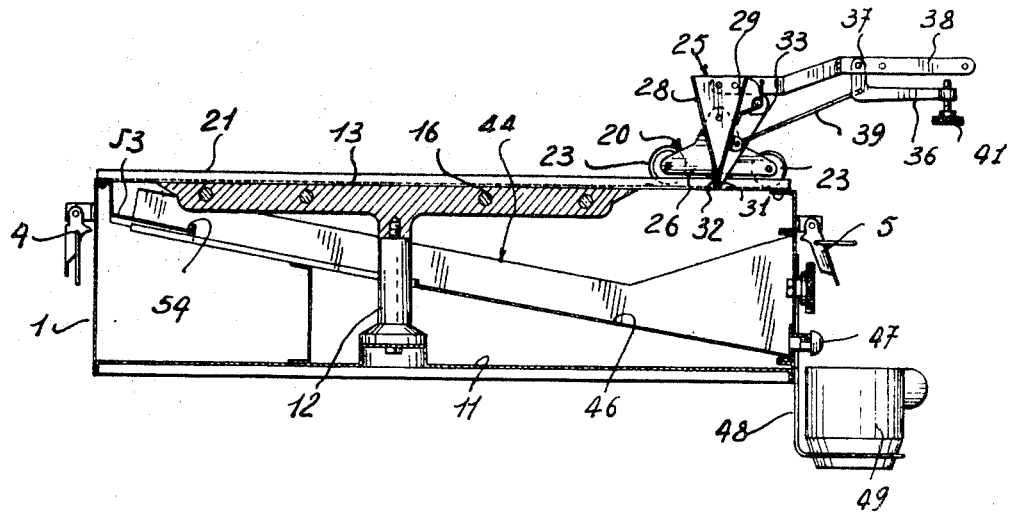
FIG. 1 is a side elevation view, partially in section, of a first embodiment of the present invention, the view in FIG. 1 being taken along line I—I of FIG. 2.
Figure 2:
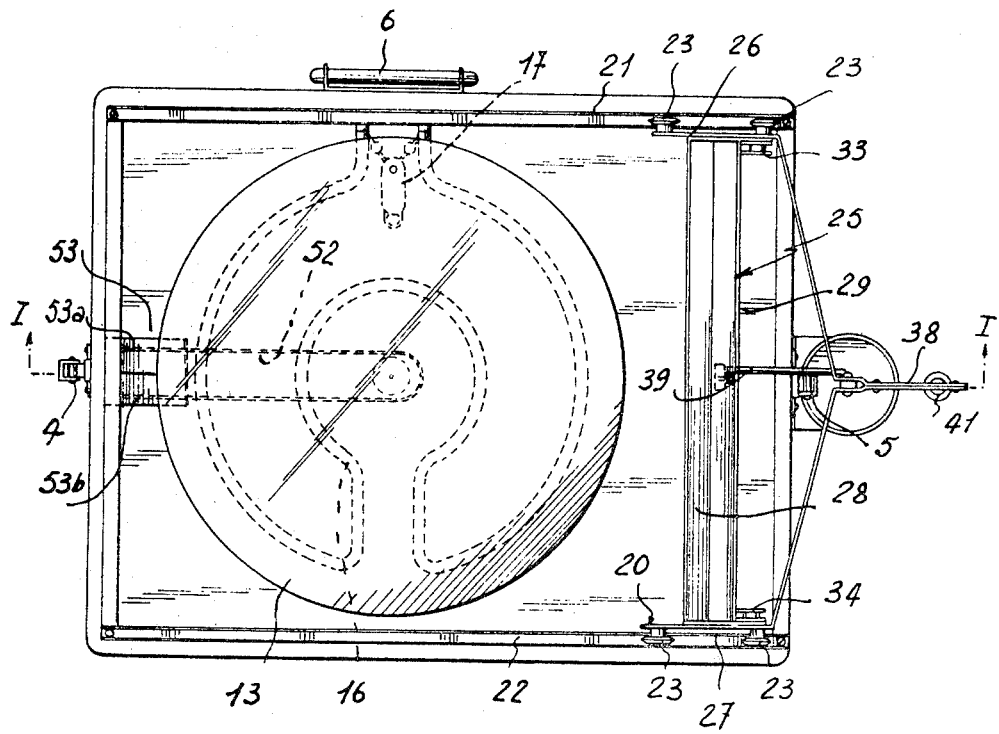
FIG. 2 is a top view of the embodiment of FIG. 1.
Figure 3:
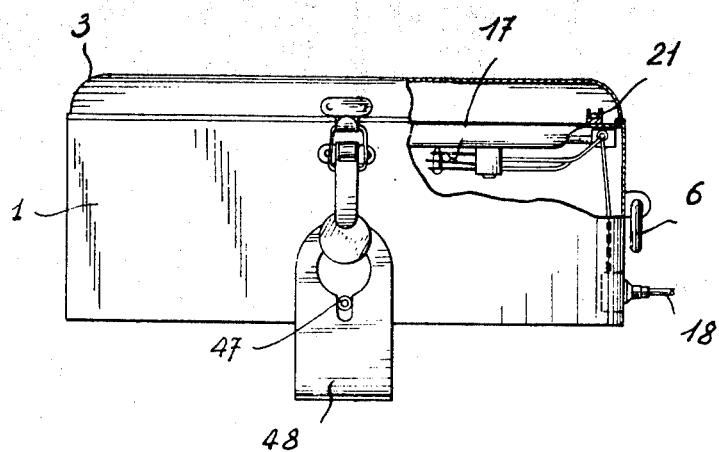
FIG. 3 is a side elevation view, partially in section, of the embodiment of FIG. 1 in condition for transporting.

With reference now to FIGS. 1—3, the present invention comprises an outer cabinet or basin 1 of generally rectangular shape. As may best be seen from joint consideration of FIGS. 1 and 3, basin 1 is provided with a removable lid 3 and quick-fastening clips 4 and 5. With lid 3 in position, as shown in FIG. 3, the invention forms a readily transportable unit having a carrying handle 6.

A circular hot plate or griddle 13 is mounted from the bottom 11 of basin 1 by means of a single, central let 12. Hot plate 13 will be heated by suitable standard means, preferably electric resistance elements 16 (FIG. 2), which are controlled by a thermostat 17 and supplied with current via a cable 18 (FIG. 3) which may be connected to any suitable outlet.

The upper sides of basin 1, at opposite sides of the hot plate 13, are provided with parallel rails 21 and 22. As may best be seen from FIG. 2, rails 21 and 22 are U-shaped. The four wheels 23 of a dispensing mechanism or trolley 20 will be engaged by rails 21 and 22 whereby the trolley may be moved from one side of the apparatus to the other above the hot plate. The trolley 20 is comprised of end members 26 and 27 separated by a transverse funnel indicated generally at 25. Funnel 25 is comprised of side members 28 and 29 which cooperate to define a V-shaped receptacle in which batter may be stored prior to dispensing. Funnel member 28 is fixed to ends 26 and 27 of trolley 20 and has a lower edge or lip 32. As will be described in greater detail below, funnel member 29 has a lip 31 which may be moved toward or away from lip 32. Under normal conditions, with the trolley at rest in the position shown in FIG. 1, lip 31 is held flexibly against lip 32 by springs 33 and 34 which are affixed to respective end pieces 26 and 27 and which urge funnel member 29 in the forward direction or to the left as shown in FIG. 1.

The movable lip 31 can be drawn away from the fixed lip 32 of funnel 25 by means of a manually operated system which comprises a grip 36 articulated on an axle 37, the axle being in turn mounted on handle 38 of trolley 20. Grip 36 is connected to funnel member 29 by means of a rod 39.

The limits of the angular movement of grip 36 with respect to handle 38 are controlled by means of adjustable screw 41 which is fitted in the free end of grip 36, screw 41 contacting the lower face of handle 38 when the grip is operated. As will be obvious, the gap between the threaded end of screw 41 and the lower face of handle 38 determines the degree of opening of the slot defined by lips 31 and 32 of funnel 25 when grip 36 and handle 38 are urged together.

A particularly advantageous feature of the present invention resides in the fact that any material dispensed from funnel 25 which falls beyond the edges of hotplate 13 is collected in a drawer indicated generally at 44. The bottom 46 of the drawer 44 is sloped toward one side of the apparatus whereby material falling into the drawer will be delivered via a connection 47 into a container 49 which is suspended from the apparatus by a support 48.

In order to enable drawer 44 to be put into position, the bottom thereof is provided with a longitudinal slot 52. The center or supporting leg 12 of hotplate 13 fits within slot 52. To avoid any possibility that material might run off the edge of hotplate 13 in the vicinity of the outer edge of the slot 52 in drawer 44, such material then falling into the bottom of basin 1 from which it would be difficult to remove, a sloping gutter 53 provided with an overhang is fixed to the wall of basin 1 as shown in FIG. 1 so as to cover at least that part of slot 52 which is under the edge of hot plate 13. Gutter 53 has slopes 53A and 53B situated respectively over the two edges of slot 52 and the gutter is also provided with a lower rim 54 whereby material falling on the gutter will necessarily be directed onto the sloping bottom 46 of drawer 44. As further protection against spillage into the bottom of basin 1, it is to be noted that the edges of slot 52 are raised as shown.

When it is desired to make a pancake, the apparatus is connected to a source of electrical power and the funnel 25 is filled with pancake batter. To make each pancake, the trolley 20 is pushed forward over the hotplate 13 while simultaneously lifting the grip 36 so that a layer of batter is deposited on the hotplate. When the trolley reaches the opposite side of the hotplate from where its movement was started, the grip 36 is released to close lips 31 and 32 of funnel 25 and the trolley may be brought back to a waiting position. When the pancake has been cooked, it is removed from hotplate 13 in the conventional manner and the batter dispensing operation is repeated. As noted above, any batter which falls outside of the periphery of hotplate 13 will be caught by drawer 46 and will flow into container 49 from whence it may be recovered for reuse.

Figure 4:
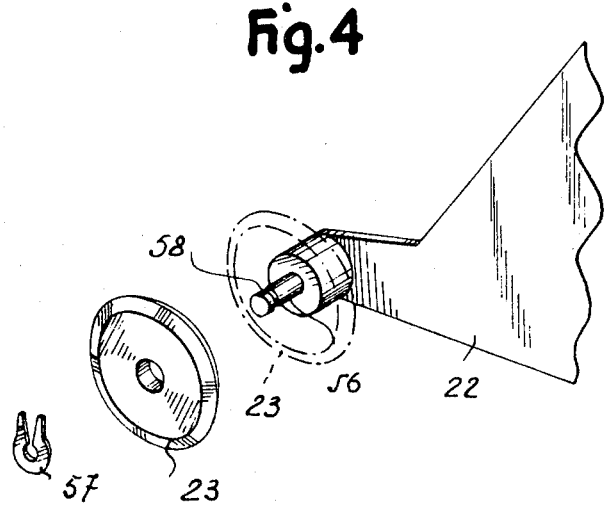
FIG. 4 is an enlarged, isometric view of a portion of the dispensing mechanism of the embodiment of FIG. 1.

As previously noted, the apparatus described above is designed so that the distribution slot in funnel 25 passes over hotplate 13. It is to be noted that the wheels 23 of trolley 20 can be made removable, as shown in FIG. 4, whereby the wheels are held on an axle 56 of trolley 28 by a flexible clip 57 housed in an annular groove in the axle. Accordingly, by using wheels of different diameter, the distance between the distribution slot in funnel 25 and the surface of hotplate 13 may be adjusted thereby adjusting the thickness of the pancakes produced by the present invention.

Figure 5:
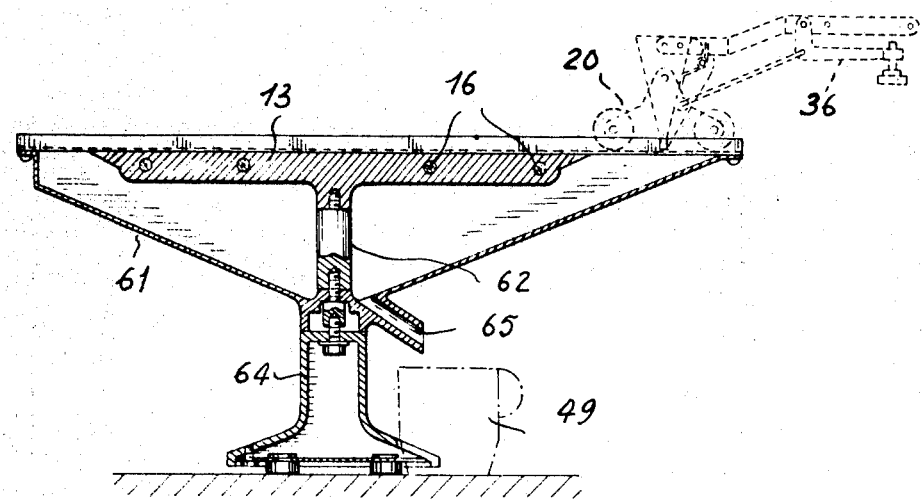
FIG. 5 is a cross-sectional, side elevation view of a second embodiment of the present invention, the view in FIG. 5 being taken along line V—V of FIG. 6.
Figure 6:
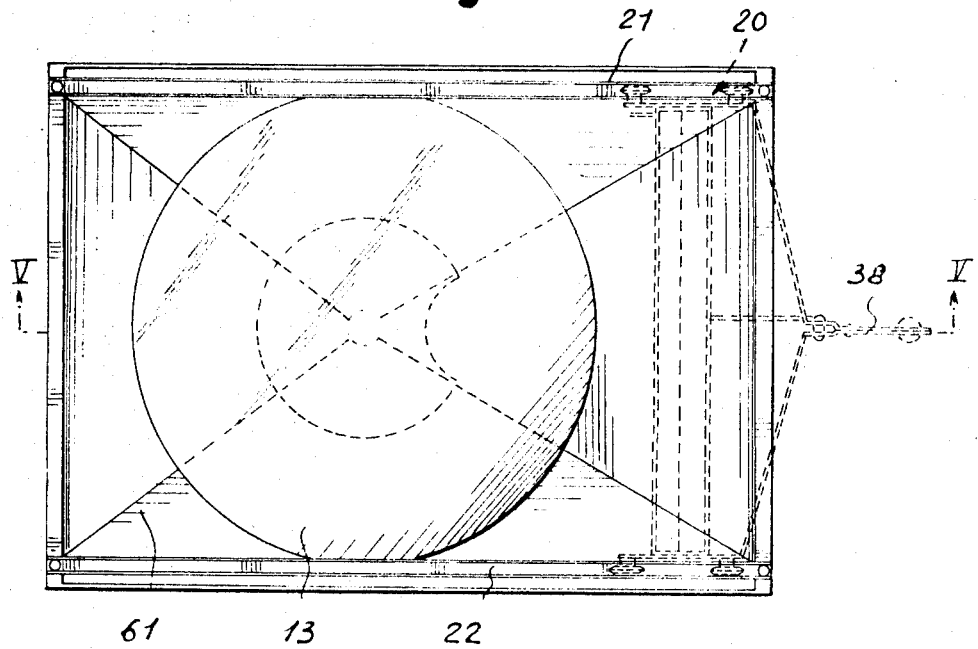
FIG. 6 is a top view of the embodiment of the present invention depicted in FIG. 5.

FIGS. 5 and 6 show a second embodiment of the present invention which differs from the embodiment described above in that, rather than employing a sloped drawer 44 to catch spillage, the basin 61 is formed in the shape of an inverted pyramid, the supporting leg 62 for hotplate 13 being in turn supported from the apex of the pyramid. The bottom of basin 61 is supported by a post or center leg 64. In order to permit the recovery of spillage, the embodiment of FIGS. 5 and 6 is provided with a conduit or tubing 65 which communicates with the interior of basin 61 whereby spilled material will flow out into container 49. The embodiment of FIGS. 5 and 6 functions in the same manner as the embodiment of FIGS. 1—3.

As may best be seen from FIGS. 1 and 5, it has been found desirable to thin the edge of hotplate 13. Due to the reduction in thickness at the edges of the hotplate, excess batter running around the edges thereof cannot cook. It has been found that if the thickness of the edge of the hotplate is not reduced, a strip of cooked batter forms thereabout and hinders the collection of excess batter in drawer 44 or basin 61.

While preferred embodiments have been shown and described, various modifications and substitutions may be made thereto without departing from the spirit and scope of the present invention. Accordingly, it is to be understood that the present invention has been described by way of illustration and not limitation.

What I claim is:

1. Cooking apparatus comprising:
a basin;
a horizontally disposed cooking surface mounted in and spacially displaced from the floor of said basin, said cooking surface comprising a circular heating plate having a marginal portion which is tapered to a thin edge;
parallel horizontal rails supported from said basin at opposite sides of said cooking surface;
an elongated fluid containing and dispensing means movably supported by said rails; and
means for selectively releasing material from said dispensing means as it traverses said cooking surface while being moved on said rails.

2. The apparatus of claim 1 wherein said dispensing means comprises:
a hopper having a longitudinal dispensing slot, the length of said slot being substantially equal to the diameter of said circular heating plate.

3. The apparatus of claim 2 wherein said basin comprises:
a container having a bottom which slopes towards a hole whereby spillage over the edges of said cooking surface may be recovered.

4. The apparatus of claim 2 further comprising:
a removable drawer disposed in said basin beneath said cooking surface, said drawer having a bottom which slopes towards a spillage recovery hole.

5. The apparatus of claim 2 wherein said releasing means comprises:
grip means for moving one of the dispensing slot defining edges of said hopper with respect to the other edge, said slot being normally closed and being moved to an opened position by operation of said grip means.

6. Cooking apparatus comprising:
a basin;
a horizontally disposed cooking surface mounted in and spacially displaced from the floor of said basin;
horizontal rails supported from said basin at opposite sides of said cooking surface;
a V-shaped funnel having a pair of oppositely disposed normally closed lips, said funnel being supported on said rails, said funnel lips defining a longitudinal dispensing slot; and
means for selectively releasing material from said funnel as it traverses said cooking surface while being moved on said rails.

7. The apparatus of claim 6 wherein said releasing means comprises:
grip means for moving one of said funnel lips away from the other of said lips whereby material will be released from said funnel onto said cooking surface.

8. The apparatus of claim 7 further comprising:
means for adjusting the degree of opening of said funnel when said grip means is operated.

9. The apparatus of claim 8 wherein said cooking surface comprises:
a circular hotplate having a region about its periphery which is tapered to a thin edge.

10. The apparatus of claim 9 wherein said dispensing slot has a length which is substantially equal to the diameter of said hotplate.

11. The apparatus of claim 6 wherein said cooking surface comprises:
a circular hotplate having a region about its periphery which is tapered to a thin edge.